(12) United States Patent
Schipani et al.

(10) Patent No.: US 6,682,297 B2
(45) Date of Patent: Jan. 27, 2004

(54) VANE FOR A STATOR OF A VARIABLE-GEOMETRY TURBINE, IN PARTICULAR FOR AERONAUTICAL ENGINES

(75) Inventors: Claudia Schipani, Turin (IT); Ennio Spano, Turin (IT); Domenico Dalle Crode, Turin (IT)

(73) Assignee: Avio S.p.A., Rivalta di Torin (IT)

( * ) Notice: Subject to any disclaimer, the term of this patent is extended or adjusted under 35 U.S.C. 154(b) by 0 days.

(21) Appl. No.: 10/063,769

(22) Filed: May 10, 2002

(65) Prior Publication Data

US 2002/0182065 A1 Dec. 5, 2002

(30) Foreign Application Priority Data

May 11, 2001 (IT) ...................................... TO2001A0446

(51) Int. Cl.$^7$ ............................................... F01D 17/16
(52) U.S. Cl. ...................................... 415/115; 415/160
(58) Field of Search ................................. 415/159, 160, 415/161, 162, 115, 116, 180

(56) References Cited

U.S. PATENT DOCUMENTS

| | | | | |
|---|---|---|---|---|
| 4,193,738 A | * | 3/1980 | Landis, Jr. et al. | ......... 415/160 |
| 4,214,851 A | * | 7/1980 | Tuley et al. | ................ 415/159 |
| 5,328,327 A | * | 7/1994 | Naudet | ........................ 415/160 |

* cited by examiner

Primary Examiner—Christopher Verdier
(74) Attorney, Agent, or Firm—Carter White; Howrey Simon Arnold & White LLP

(57) ABSTRACT

A vane for a stator of a variable-geometry turbine, in particular for aeronautical engines, has an airfoil profile and a pair of hinge portions, which are carried by the airfoil profile and enable the airfoil profile to be coupled to a support structure of the stator so as to be rotatable about an axis of adjustment; the vane also has internal channels that allow a flow of air to pass through in order to cool the hinge portions.

9 Claims, 2 Drawing Sheets

VANE FOR A STATOR OF A VARIABLE-GEOMETRY TURBINE, IN PARTICULAR FOR AERONAUTICAL ENGINES

CROSS REFERENCE TO RELATED APPLICATIONS

This Application claim priority under 35 U.S.C. §119 of Italian application number TO2001A 000445, filed May 11, 2001 in Italy.

BACKGROUND OF INVENTION

The present invention relates to a vane for a stator of a variable-geometry turbine, in particular of an axial turbine for aeronautical engines.

As is known, an axial turbine for an aeronautical engine comprises at least one stator and one rotor arranged in succession to each other and comprising respective arrays of vanes delimiting between them associated nozzles through which a flow of gas can pass.

In aeronautical engines, it has been found necessary to use axial turbines having relatively high efficiency in all operating conditions and, therefore, over a relatively wide range of values for the rate of flow of the gases that pass through the turbine itself.

This requirement could be met by producing variable-geometry turbines, i.e. turbines in which it is possible to vary the transverse area of the nozzles of at least one stator, in particular by adjusting the angular position of the stator vanes about respective axes incident to the axis of the turbine.

In use, however, the operating temperatures of the turbine are extremely high and involve considerable thermal expansion of the vanes and other components, so that jamming or outright seizure could occur between the movable vanes and the fixed parts of the stator, consequently compromising the functionality of the turbine.

SUMMARY OF INVENTION

The purpose of this invention is to produce a vane for a stator of a variable-geometry turbine, in particular for aeronautical engines, which allows the problems set out above to be solved simply and economically.

According to the present invention, a vane is produced for a stator of a variable-geometry turbine, in particular for aeronautical engines; the vane comprising an airfoil profile and means for coupling said airfoil profile to a support structure of said stator; characterised in that said coupling means comprise hinge means carried by said airfoil profile to allow rotation of the airfoil profile itself with respect to said support structure about an axis of adjustment, and in that it comprises means for cooling said hinge means.

The present invention also concerns a stator of a variable-geometry turbine, in particular for aeronautical engines.

According to the present invention, a stator of a variable-geometry turbine is produced, in particular for aeronautical engines; the stator comprising a support structure and a plurality of vane members delimiting between them a plurality of passages for a flow of gas; each vane comprising an airfoil profile and means for coupling said airfoil profile to said support structure; characterised in that said coupling means comprise hinge means carried by said airfoil profile to allow the rotation of the airfoil profile with respect to said support structure about an axis of adjustment, and in that it comprises means for cooling said hinge means.

BRIEF DESCRIPTION OF DRAWINGS

The invention will now be described with reference to the attached drawings, which illustrate a non-limiting embodiment of the invention, in which.

DETAILED DESCRIPTION

Figure 1:
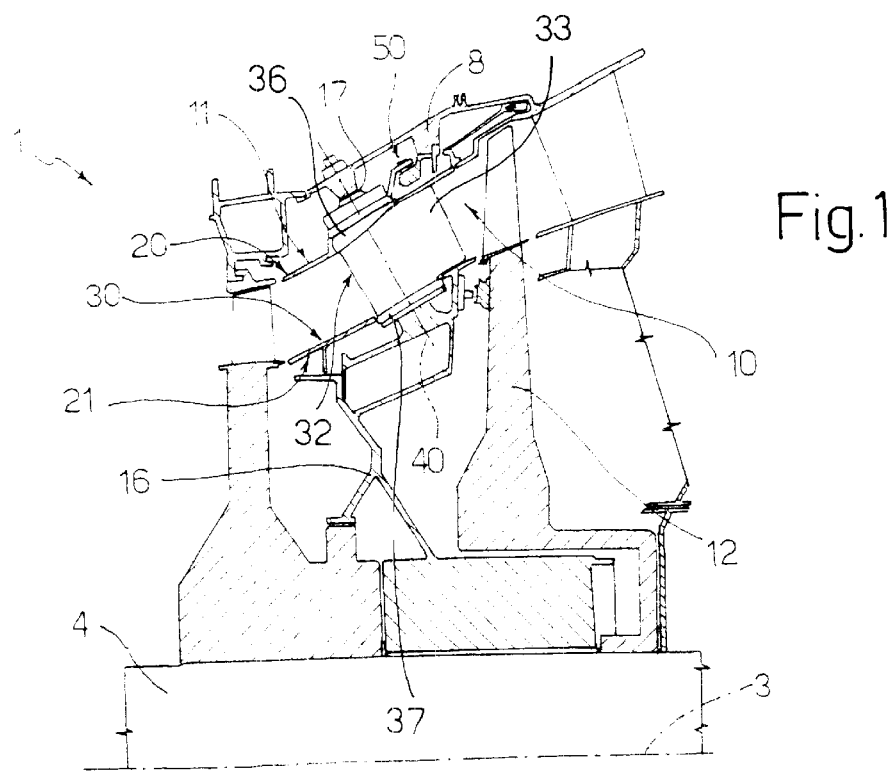
FIG. 1 is a schematic radial section of a preferred embodiment of the vane for a stator of a variable-geometry turbine, in particular for aeronautical engines, produced according to the present invention.

In FIG. 1, the number 1 indicates a variable-geometry axial turbine (shown schematically and in part), which constitutes part of an aeronautical engine, not shown.

The turbine 1 is axially symmetrical with respect to an axis 3 coinciding with the axis of the associated aeronautical engine and comprises an engine shaft 4 rotatable about the axis 3 and a case or casing 8 housing a succession of coaxial stages, only one of which is shown as 10 in FIG. 1.

Figure 2:
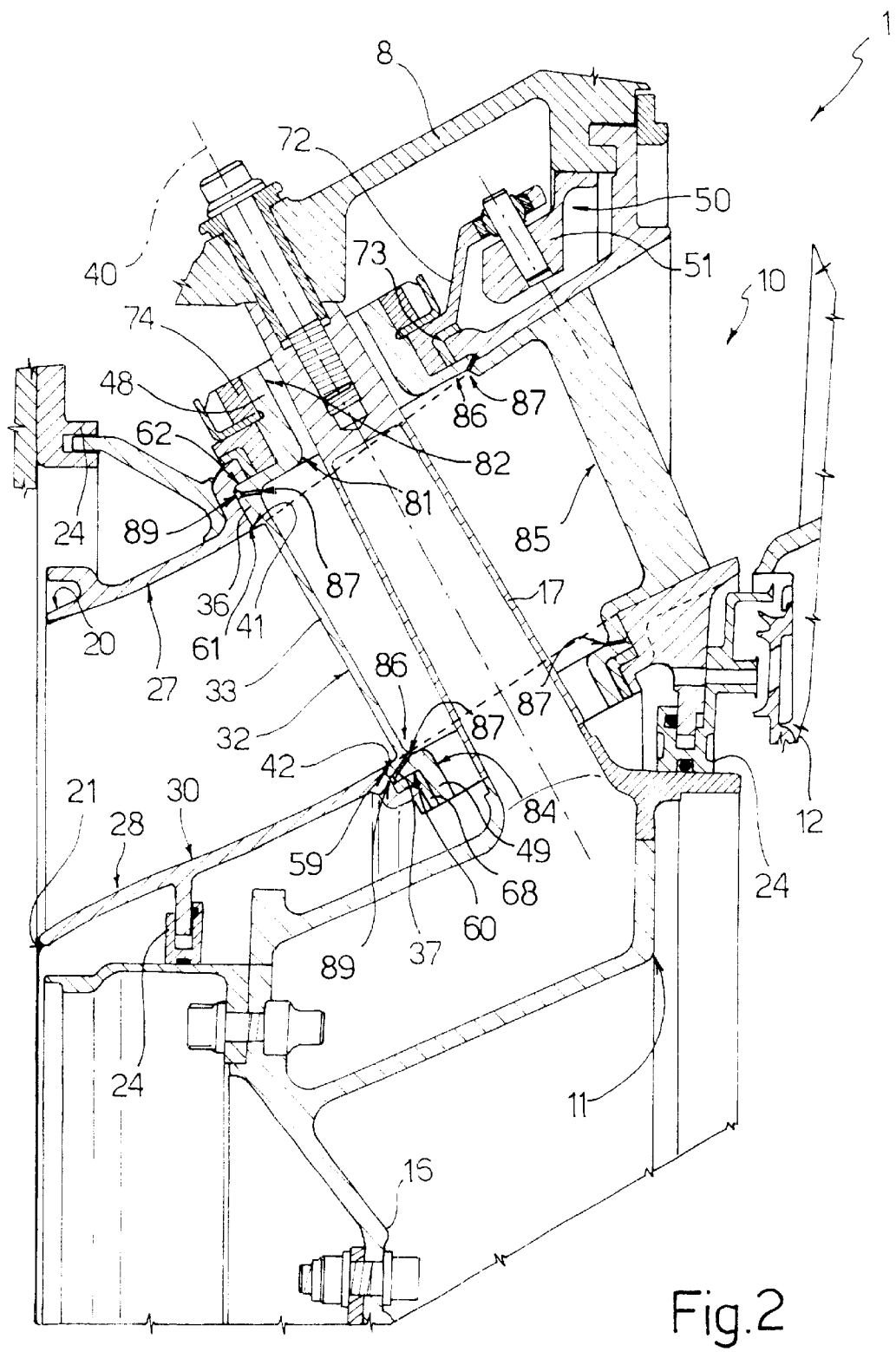
FIG. 2 illustrates in radial section and at a larger scale the vane in FIG. 1.

With reference to FIGS. 1 and 2, the stage 10 comprises a stator 11 and a rotor 12 keyed to the engine shaft 4 downstream from the stator 11. The stator 11 in turn comprises a hub 16 (shown schematically and in part), which supports the engine shaft 4 in a known manner and is integrally connected to the casing 8 by means of a plurality of spokes 17 (FIG. 2) angularly equidistant from each other about the axis 3.

As shown in FIG. 2, the stator 11 also comprises two annular platforms or walls 20, 21, which are arranged in an intermediate radial position between the hub 16 and the casing 8 and have the spokes 17 passing through them. The walls 20, 21 are coupled, one with the casing 8 and the other with the hub 16 in substantially fixed datum positions by means of connecting devices 24 that allow the walls 20, 21 themselves the possibility of axial and radial displacements of relatively limited amplitude with respect to the casing 8 and the hub 16 in order to compensate, in service, for the differences in thermal expansion between the various components.

The walls 20, 21 have respective surfaces 27, 28 facing each other and radially delimiting an annular duct 30 with a diameter increasing in the direction of travel of the gas flow that passes through the turbine 1. The walls 20, 21 carry an array of vanes 32 (only one of which is shown) angularly equidistant from each other about the axis 3 with the spokes 17 passing through them and comprising respective airfoil profiles 33, which are housed in the duct 30 and between them circumferentially delimit a plurality of nozzles.

Figure 3:
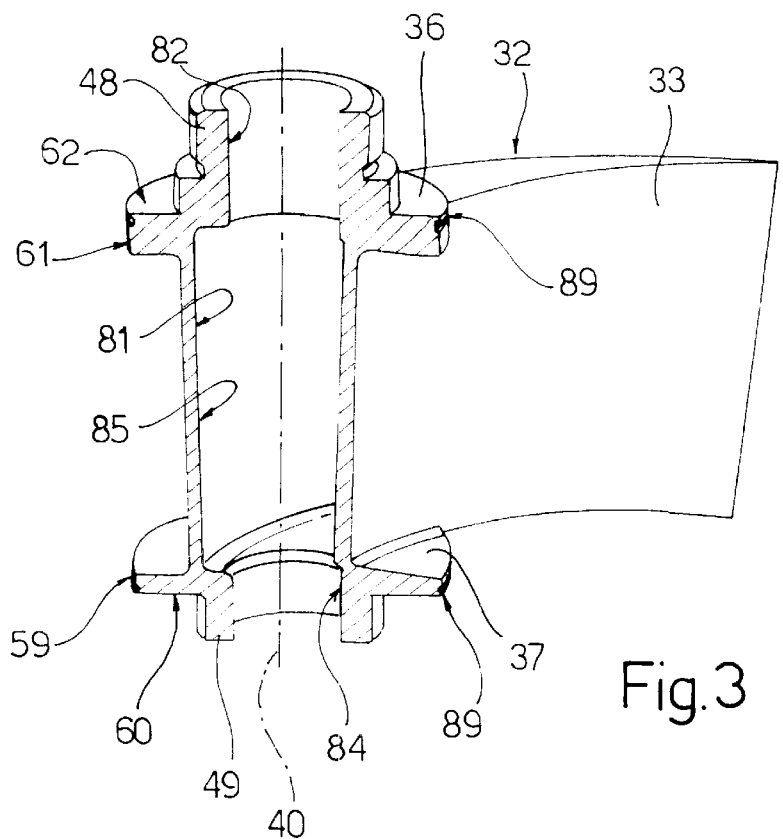
FIG. 3 is a perspective view, with parts in section, of the vane in FIGS. 1 and 2.

With reference to FIGS. 2 and 3, each vane 32 also comprises a pair of circular hinging flanges 36, 37, integral with the associated profile 33, arranged at opposite ends of the profile 33 itself and coaxial with each other along an axis 40, which is incident to the axis 3 and forms an angle other than 90° with the axis 3.

The flanges 36, 37 of each vane 32 engage rotatably in respective circular seatings 41, 42 made in the walls 20 and 21 respectively to allow the associated profile 33 to rotate about the axis 40.

With reference to FIG. 2, the flanges 36, 37 of each vane 32 terminate in respective coaxial cylindrical sections 48, 49, of which the section 48 is caused to rotate in use by an angular positioning unit 50 (shown in part) comprising in particular a motor-driven actuating and synchronising ring 51 designed to rotate the profiles 33 simultaneously about the respective axes 40 through the same angle, keeping the profiles 33 themselves in the same orientation to each other with respect to the surfaces 27, 28. In particular, the maximum angular deflection of each vane 32 about the associated axis 40 is approximately 6°, while the zones of the surfaces 27 and 28 to which the profiles 33 are coupled slidably have a shape complementary to associated ideal surfaces generated by rotation of the profiles 33.

The flanges 36, 37 of each vane 32 are defined by respective circular plate portions, project from the associated profile 33 radially with respect to the axis 40 and are facing each other in the duct 30.

The flange 37 is delimited by a cylindrical surface 59 directly and slidably coupled with the wall 21 in the seating 42 and by a flat surface 60 connecting the surface 59 to the section 49, which is coupled to the wall 21 via an interposed spacer bush 68 constituting a friction bearing.

On the other hand, the flange 36 is delimited by a cylindrical surface 61 directly and slidably coupled with the wall 20 in the seating 41 and by a flat surface 62, which connects the surface 61 to the section 48, and against which is arranged an axially abutting radial lever 72 connecting the vane 32 to the ring 51. In particular, the lever 72 is attached to the section 48 and is coupled with the wall 20 via an interposed spacer bush 73 constituting a friction bearing.

With reference to FIGS. 2 and 3, each vane 32 is cooled in use by a flow of air under pressure, which is conveyed into the case 8 in a known manner, not shown, and flows through a passage 81 made in the vane 32 itself and comprising an inlet 82 defined by the flange 36, an outlet 84 defined by the flange 37 and an intermediate chamber 85 made in the profile 33. The chamber 85, in particular, communicates with the duct 30 via a plurality of holes (not shown) made in a tail portion of the profile 33 to cool the trailing edge of the profile 33 itself which, in use, is subject to severe thermal stresses.

The flow of cooling air removes heat from the flanges 36, 37 by passing through the inlet 82 and the outlet 84 and also by means of channelling 86 inside the flanges 36, 37 themselves. This channelling 86 comprises, for each flange 36, 37 at least one associated pair of through-holes 87 (FIG. 2) made in positions diametrically opposite to each other and in a substantially radial direction, and an associated continuous circumferential groove 89, which is made along the surface 59, 61 close to the circular edge or corner of separation from the surface 60, 62 and communicates with the chamber 85 via the holes 87.

In use, the flow of cooling air is sent at a pressure of about 20 bar into the passage 81, flows through the holes 87 and removes heat from the flanges 36, 37 to limit the thermal expansion of the flanges 36, 37 themselves.

The air sent into the grooves 89, at the same time, forms a film or cushion of air that performs not only a load-bearing function during rotation of the vanes, limiting the friction forces between flanges 36, 37 and walls 20, 21, but above all a sealing function preventing the flow of gas from flowing out of the duct 30 through the clearances formed between the vanes 32 and the walls 20, 21 in the seatings 41, 42.

In other words, in the grooves 89 the cushion of air constitutes a sort of virtual sealing ring that avoids the use of sealing gaskets between the vanes 32 and the walls 20, 21.

From the above, it is evident that the vanes 32 enable the geometry of the nozzles of the stator 11 to be adjusted in use, the vanes being hinged to the walls 20, 21, and at the same time avoid jamming and seizure against the walls 20, 21 during adjustment, being cooled at the flanges 36, 37.

In fact, the removal of heat by means of the flow of air that passes through the passage 81 and the channelling 86 makes it possible to limit the thermal expansion of the flanges 36, 37 and thus to control the clearances between the flanges 36, 37 themselves and the walls 20, 21 in order to obtain correct and always precise angular positioning of the vanes 32 about the respective axes 40.

Moreover, as already stated, the fact of causing air to flow along the surfaces 59, 61 makes it possible to produce a cushion of air that limits the friction between the flanges 36, 37 and the walls 20, 21 and therefore contributes significantly to obtaining precise angular positioning of the vanes 32 and thus correct operation of the turbine 1, achieving high levels of efficiency in all operating conditions of the associated aeronautical engine.

Finally, it is evident from the above that modifications and variations can be made to the vane 32 described and illustrated, without extending it beyond the scope of protection of the present invention.

In particular, the vane 32 could have hinge portions different from those described and illustrated and/or cooling fluids or channels different from those indicated could be provided. For example, the cushions of air that are formed in use between the flanges 36, 37 and the walls 20, 21 could be obtained by producing seatings in the walls 20, 21 instead of in the vanes 32, or a simple chamfer along the corners between the surfaces 59, 61 and the surfaces 60, 62. Moreover, a labyrinth seating could be provided instead of a simple groove 89 on the flanges 36, 37.

What is claimed is:

1. A vane (32) for a stator (11) of a variable-geometry turbine (1) for aeronautical engines; the vane comprising an airfoil profile (33) and means for coupling (36, 37) said airfoil profile (33) to a support structure (20, 21) of said stator (11); characterised in that said coupling means (36, 37) comprise hinge means (36, 37) carried by said airfoil profile (33) to allow the airfoil profile (33) to rotate with respect to said support structure (20, 21) about an axis of adjustment (40), and in that said coupling means comprises means for both cooling (81, 86) said hinge means (36, 37) and sealing said vane (32) to said support structure (20. 21).

2. The vane according to claim 1 characterised in that said coupling means (81, 86) comprise a cavity (81) for cooling fluid made in said vane (33) and communicating with the outside and at least one channel (87, 89) made in said hinge means (36, 37) and communicating with said cavity (81).

3. The vane according to claim 2 characterised in that said at least one channel (87) is made inside said hinge means (36, 37).

4. The vane according to claim 2 characterised in that said hinge means (36, 37) are delimited by a lateral surface (59, 60, 61, 62) designed to co-operate slidably with said support structure (20, 21), said at least one channel (89) being made at least partly on said lateral surface (59, 60, 61, 62).

5. The vane according to claim 4 characterised in that said at least one channel (89) comprises a continuous circumferential groove (89).

6. The vane according to claim 4 characterised in that there are plural lateral surfaces, each said lateral surface (59, 60, 61, 62) comprises an associated first cylindrical surface (59, 61) and an associated second surface (60, 62) transverse to said axis of adjustment (40), wherein said lateral surface (59, 60, 61 62) are designed to co-operate slidably with said support structure (20, 21); said at least one channel (89) being made along said first surface (59, 61).

7. The vane according to claim 6 characterised in that said at least one channel (89) is made close to the edge of separation between said first (59, 61) and second (60, 62) surfaces.

8. The vane according to claim 2 characterised in that said hinge means (36, 37) comprise a pair of hinge portions (36, 37) arranged at opposite axial ends of said airfoil profile (33); said cavity (81) being made to pass through said airfoil profile (33) and through said hinge portions (36, 37).

9. A stator (11) of a variable-geometry turbine (1) for aeronautical engines; the stator (11) comprising a support structure (20, 21) and a plurality of vane members (32) delimiting between them a plurality of nozzles for a flow of gas; each vane (32) comprising an airfoil profile (33) and means for coupling (36, 37) said airfoil profile (33) to said support structure (20, 21); characterised in that said coupling means (36, 37) comprise hinge means (36, 37) carried by said airfoil profile (33) to enable the airfoil profile (33) to rotate with respect to said support structure (20, 21) about an axis of adjustment (40), and in that said coupling means comprises means for both cooling said hinge means (36, 37) and sealing said vane (32) to said support structure (20, 21).

* * * * *